United States Patent [19]
Kawafuji

[11] Patent Number: 5,096,332

[45] Date of Patent: Mar. 17, 1992

[54] METHOD FOR WATER LEAKAGE PREVENTION IN PIPELINE AND LINER FOR WATER LEAKAGE PREVENTION

[75] Inventor: Takayuki Kawafuji, Tokyo, Japan

[73] Assignees: Toa Grout Kogyo Kabushiki Kaisha; Kabushiki Kaisha Iseki Kaihatsu Koki, both of Tokyo, Japan

[21] Appl. No.: 566,837

[22] Filed: Aug. 13, 1990

[30] Foreign Application Priority Data

Aug. 15, 1989 [JP] Japan .................................. 1-209531

[51] Int. Cl.$^5$ .............................................. E03B 7/10
[52] U.S. Cl. ...................................... 405/157; 405/154
[58] Field of Search .............. 405/157, 154, 184, 156, 405/155

[56] References Cited

U.S. PATENT DOCUMENTS

| | | | |
|---|---|---|---|
| 1,200,119 | 10/1916 | Keeler | 405/184 X |
| 4,091,630 | 5/1978 | Nenloto et al. | 405/184 X |
| 4,815,896 | 3/1989 | Fox et al. | 405/157 X |
| 4,874,268 | 10/1989 | Akesaka | 405/184 |
| 4,921,374 | 5/1990 | Stutzman | 405/157 X |

Primary Examiner—Dennis L. Taylor
Assistant Examiner—J. Russell McBee
Attorney, Agent, or Firm—Stoel Rives Boley Jones & Grey

[57] ABSTRACT

A method for preventing water leakage into and out from a pipeline utilizes an injection material and a liner. The injection material exhibits fluidity and hardenability. The liner includes an elastically deformable sleeve having an outer diameter smaller than the inner diameter of the pipe and a plurality of elastically deformable and successively circumferentially extending projection portions formed at axial intervals on the circumferential surface of the sleeve; a sheetlike base placed inside the sleeve in a radially expandable, wound cylindrical form; fixing means for maintaining the base in a substantially cylindrical form when the base is radially expanded inside the sleeve; and check valve means defined by the sleeve and the base when the base is radially expanded. The check valve means permits the injection material to flow from the inside of the base into the space between the projection portions in the axial direction.

7 Claims, 12 Drawing Sheets

METHOD FOR WATER LEAKAGE PREVENTION IN PIPELINE AND LINER FOR WATER LEAKAGE PREVENTION

BACKGROUND OF THE INVENTION

1. Field of the Invention

This invention relates to a method for preventing water from flowing out from a pipeline and flowing into the pipeline. More specifically, this invention relates injection material exhibiting fluidity and hardenability. A liner for applying the method to water leakage prevention is also presented.

2. Description of the Prior Art

One of the known methods for preventing water leakage into and out from pipelines used for sewers, water supply and electric cables involves the injection of a material exhibiting fluidity and hardenability into the ground surrounding a leaking portion of a pipe from the inside of the pipe, so that the leaking portion is stopped up by the injected material.

According to this known method, the inside of the pipe is partitioned by partitioning means into a space corresponding to the leaking portion and another space. An injection material is supplied to the space corresponding to the leaking portion, injected around the pipe from the leaking portion, and hardened.

In the prior art, however, there is a risk that the injected material may flow backward into the pipe if the partitioning means is removed from the pipe before the injected material has hardened, thereby requiring a large amount of an agent for accelerating the solidification of the injected material to be added to that material in order to prevent reflux of the injected material into the pipe.

SUMMARY OF THE INVENTION

It is an object of the present invention to provide a method for preventing water leakage in a pipe, which effectively prevents an injection material from flowing backward into the pipe, and a liner for use in such a method.

A method according to the present invention for preventing water leakage into and out from a pipeline by utilizing an injection material exhibiting fluidity and hardenability includes the steps of:

disposing inside a pipe defining the pipeline a liner provided with an elastically deformable sleeve having an outer diameter smaller than the inner diameter of the pipe and having a plurality of elastically deformable and successively circumferentially extending projection portions formed at intervals in the axial direction of the sleeve on the circumferential surface of the sleeve; a sheet-like base placed inside the sleeve in a radially expandable, spirally wound condition; fixing means for maintaining the base in a substantially cylindrical shape when the base is radially expanded inside the sleeve; and check valve means defined by the sleeve and the base when the base is radially expanded, said check valve means permitting the injection material to flow out from the inside of the base into the space between the projection portions in the axial direction;

radially expanding the base to elastically deform the sleeve until the projection portions are pressed against the inner surface of the pipe and are elastically deformed;

supplying injection material into the space between the sleeve and the pipe through the check valve means while maintaining the projection portions in an elastically deformed condition; and keeping the base in an expanded condition through the fixing means to maintain the projection portions in an elastically deformed condition.

The injection material that has flowed into the space between the sleeve and the pipe is injected into the ground around the pipe through the crack or joint in the of the pipe, the check valve functions to prevent the injection material between the sleeve and the pipe from flowing backward to the inside of the base. Thus, the injection material injected into the ground around the pipe does not flow backward into the pipe. The injection material that has flowed into the space between the sleeve and the pipe and the injection material that has flowed around the pipe harden with the lapse of time, and, consequently, water leakage through the crack or the joint in the pipeline is prevented.

According to the method for leakage prevention of the present invention, the injection material that has flowed into the space between the sleeve and the pipe and around the pipe does not flow backward to the inside of the base even though the means for radially expanding the base and the means for supplying the injection material are removed, because the liner is attached on the inner surface of the pipe and the check valve means functions effectively. Furthermore, since the liner itself functions to prevent leakage, leakage prevention is maintained even though the hardened injection material deteriorates with the lapse of time. As a result, leakage prevention achieved by the present invention remains effective for a longer period.

Injecting the injection material becomes easier if the injection material can be supplied into the space, defined inside the liner and communicated with the check valve means, to supply the injection material into the portion around the pipe while the space connected to the check valve means is partitioned from the other space by the means for expanding the base.

The expanding means can be removed when the base is maintained in the radially expanded condition by the fixing means.

Another water leakage prevention method according to the present invention includes the steps of:

cutting the pipe defining the pipeline in order to form an annular recess along the inner surface of the pipe at a predetermined position in the pipe, disposing in the recess a liner provided with an elastically deformable sleeve having an outer diameter smaller than the inner diameter of the pipe and having a plurality of elastically deformable and successively circumferentially extending projection portions formed at intervals in the axial direction of the sleeve on the circumferential surface of the sleeve; a sheet-like base placed inside the sleeve in a radially expandable, spirally wound condition; fixing means for maintaining the base in a substantially cylindrical form when the base is radially expanded in the sleeve; and check valve means defined by the sleeve and the base when the base is radially expanded, the check valve means permitting the injection material to flow from the inside of the base into the space between the projection portions in the axial direction, radially expanding the base to elastically deform the sleeve until the projection portions are pressed against the inner surface of the pipe and are elastically deformed, supplying injection material into the space between the sleeve and the pipe through the check valve means while maintaining the projection portions in an elastically deformed condition, and keeping the base in an expanded condition through the fixing means to maintain the projection portions in an elastically deformed condition.

Since the liner is placed in the recess according to this leakage prevention method, no foreign matter will be taken by the liner when this method is applied to sewers.

The liner for leakage prevention of the present invention includes:

an elastically deformable sleeve having a plurality of elastically deformable and successively circumferentially extending projection portions formed at intervals in the axial direction of the sleeve on the circumferential surface of the sleeve;

a sheet-like base placed inside the sleeve in a radially expandable, spirally wound condition;

fixing means for maintaining the base in a substantially cylindrical form when the base is radially expanded in the sleeve; and check valve means defined by the sleeve and the base, the check valve means permitting the injection material exhibiting fluidity to flow from the inside of the base into the space between the projection portions in the axial direction.

According to the liner of the present invention, the check valve means functions effectively so long as the base is maintained in its radially expanded condition by the fixing means. Therefore, the injection material that has flowed into the space between the sleeve and the pipe and that around the pipe does not flow backward to the inside of the base even though the means for expanding the base and the means for supplying the injection material are removed.

The check valve means preferably includes a pair of cut portions formed on the sleeve and spaced apart from each other, each cut portion extending through the sleeve in the thickness direction thereof, and a hole extending through the base in the thickness direction thereof and formed at a position corresponding to the portion between the cut portions on the sleeve, thereby simplifying the structure of the check valve means.

BRIEF DESCRIPTION OF THE DRAWINGS

The foregoing and other objects and features of the invention will become apparent from the following description of preferred embodiments of the invention with reference to the accompanying drawings, in which.

DESCRIPTION OF THE PREFERRED EMBODIMENTS

Figure 1:
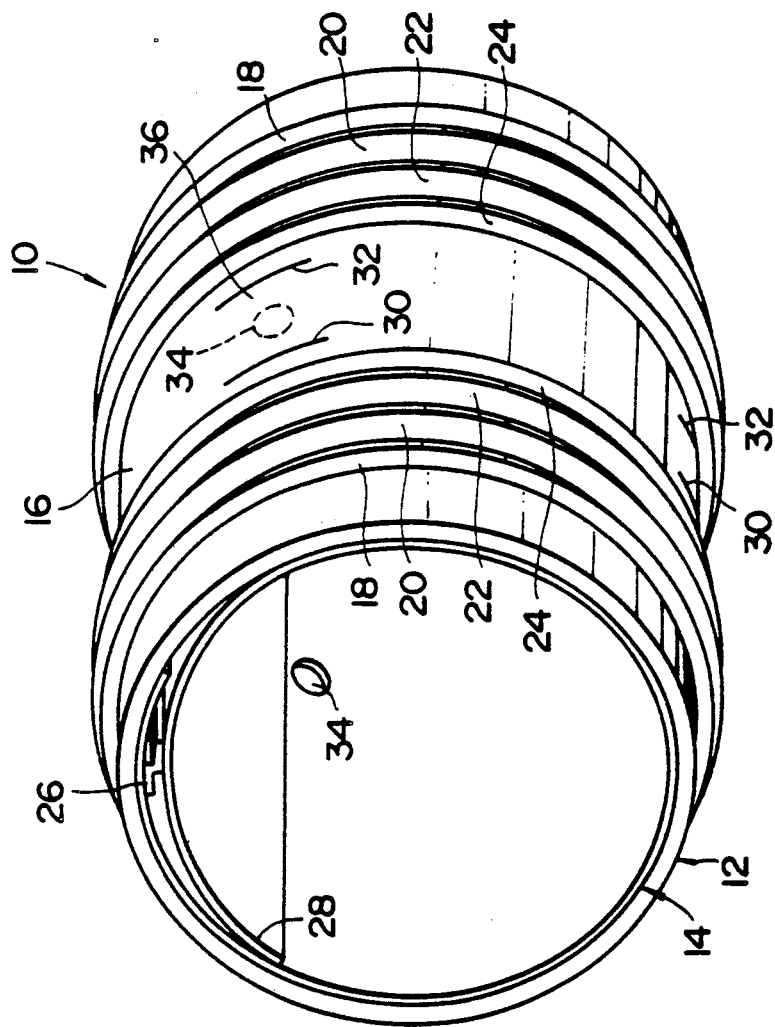
FIG. 1 is a perspective view of a covering material of a preferred embodiment of the present invention.

In FIG. 1, a liner 10 includes an elastically deformable sleeve 12 and an elastically deformable sheet-like base 14. It is desirable that sleeve 12 be made of an impermeable polymeric material such as rubber or a synthetic resin. It is desirable that base 14 be made of a corrosion-resistant material such as stainless steel, copper or a copper alloy.

Figure 2:
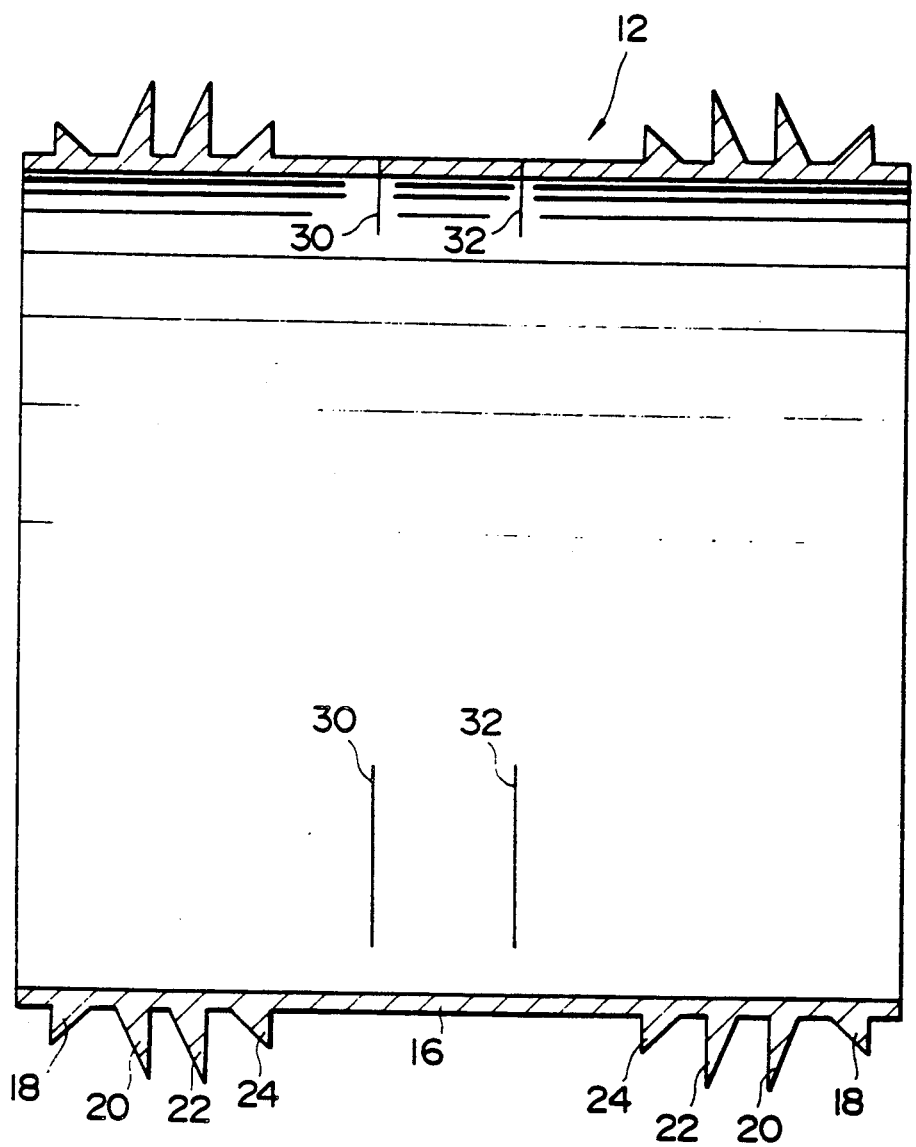
FIG. 2 is an enlarged cross-sectional view of a sleeve of a preferred embodiment of the present invention.

Sleeve 12 has a plurality of projection portions 18, 20, 22 and 24 formed on each end of a cylindrical portion 16 in the axial direction thereof and successively extending in the circumferential direction on the circumferential surfaces of the corresponding end. As shown in FIG. 2, each projection portion 18, 20, 22 and 24 has a cross-section shape of a right triangle, with the base of the right triangle formed at the side of cylindrical portion 16. All projection portions or intermediate projection portions 20 and 22 may be made of a synthetic resin that expands by absorbing water.

Figure 3:
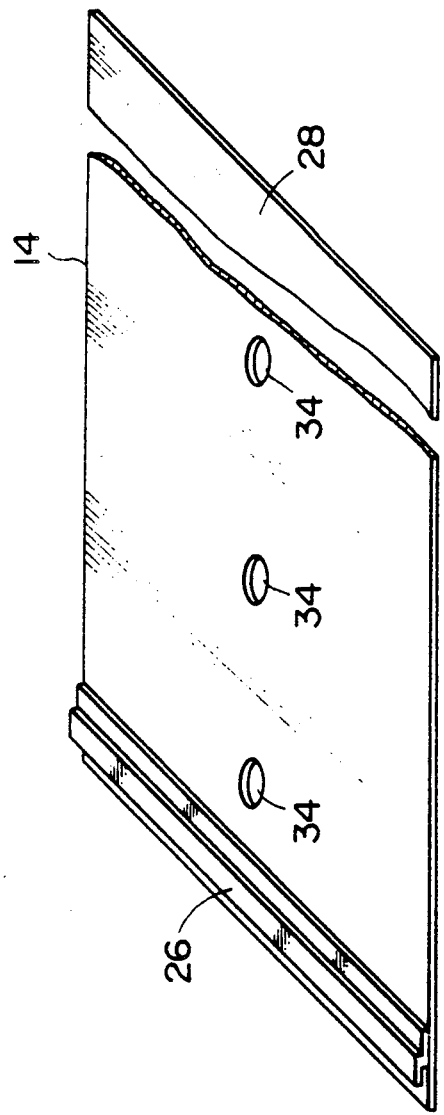
FIG. 3 is a enlarged perspective view of a base of a preferred embodiment of the present invention.

A female engaging portion 26 is formed at one end of base 14 in the longitudinal direction. As shown in FIG. 3, female engaging portion 26 has a Z-like cross sectional shape and consists of an elongate metal fitting fixed at base 14. Also, female engaging portion 26 extends along base 14 over its entire width. A male engaging portion 28 receivable within female engaging portion 26 to be engaged therewith is the other end portion of base 14 in FIG. 3, but may be an engaging portion having a different shape, for example, a metal fitting similar to female engaging portion 26.

As shown in FIGS. 1 and 2, sleeve 12 has three pairs of cuts 30 and 32 extending from one side to the other of sleeve 12 in the thickness direction thereof. Cuts 30 and 32 are positioned at the center portion in the axial direction of sleeve 12 and formed at equal angular intervals in the circumferential direction of sleeve 12.

As shown in FIG. 3, base 14 has three holes 34 extending through base 14 in the thickness direction thereof. Holes 34 are formed at positions that are at equal angular intervals when base 14 is deformed into a cylindrical form and engaging portions 26 and 28 are engaged, namely, when base 14 is in a radially expandable, spirally wound condition.

As shown in FIG. 1, base 14 is wound, i.e., bent, spirally, such that male engaging portion 28 is positioned inside female engaging portion 26 and that one hole 34 positioned at the center is opposite to a portion 36 between a pair of cuts 30 and 32 of sleeve 12. Thereafter, base 14 is positioned inside sleeve 12. In this condition, base 14 is bound by sleeve 12 and prevented from expanding radially. In this manner, the relative movements of sleeve 12 and base 14 along the axial direction of sleeve 12 can be prevented without using any particular metal fitting. However, base 14 may be spirally wound in advance, such that base 14 is positioned within sleeve 12.

The inner diameter of sleeve 12, the axial length of sleeve 12, the thickness of cylindrical portion 16, and the length, the thickness and the cross-sectional shape of each projection portion 18, 20, 22 and 24 are all arbitrarily selected depending on their mutual relation, dimensions of the pipe to be processed for leakage prevention and those of the portions to be processed as well. However, the outer diameter of sleeve 12 is smaller than the inner diameter of the pipe to be processed for leakage prevention. Also, the inner diameter of sleeve 12 is smaller than the outer diameter of base 14 when base 14 is radially expanded, such that engaging portions 26 and 28 are engaged with each other.

In the illustrated embodiment of FIG. 2, the height of each projection portion 18 and 24 is greater than the thickness of cylindrical portion 16, and the height of each projection portion 20 and 22 is greater than that of each projection portion 18 and 24. However, the height of each projection portion 18 and 24 may be smaller than or equal to the thickness of cylindrical portion 16. Also, the height of each projection portion 18, 20, 22 and 24 may be equal.

For instance, in the case of sleeve 12 for a sewer of 250 mm bore diameter, the inner diameter of sleeve 12, thickness of the cylindrical portion 16 of sleeve 12, the height of each projection portion 18 and 24, and that of each projection portion 20 and 22 can be set at 180-220 mm, 0.5-1 mm, 2-5 mm, and 5-10 mm, respectively.

In the illustrated embodiment of FIG. 2, the width of base 14, namely, the axial length, is substantially equal to the axial length of sleeve 12, however, liners of the present invention are satisfactory so long as the length is greater than the distance between both ends of projection portions 18, which are positioned at the extreme ends of sleeve 12. The length of base 14 is greater than that along the inside of sleeve 12 but varies depending on the inner diameter of the pipe to be processed for leakage prevention. The thickness of base 14 may be smaller than that of sleeve 12 and is defined as 0.5-3 mm, for example.

An embodiment of the present invention will now be described concerning the method for leakage prevention utilizing liner 10.

Figure 4:
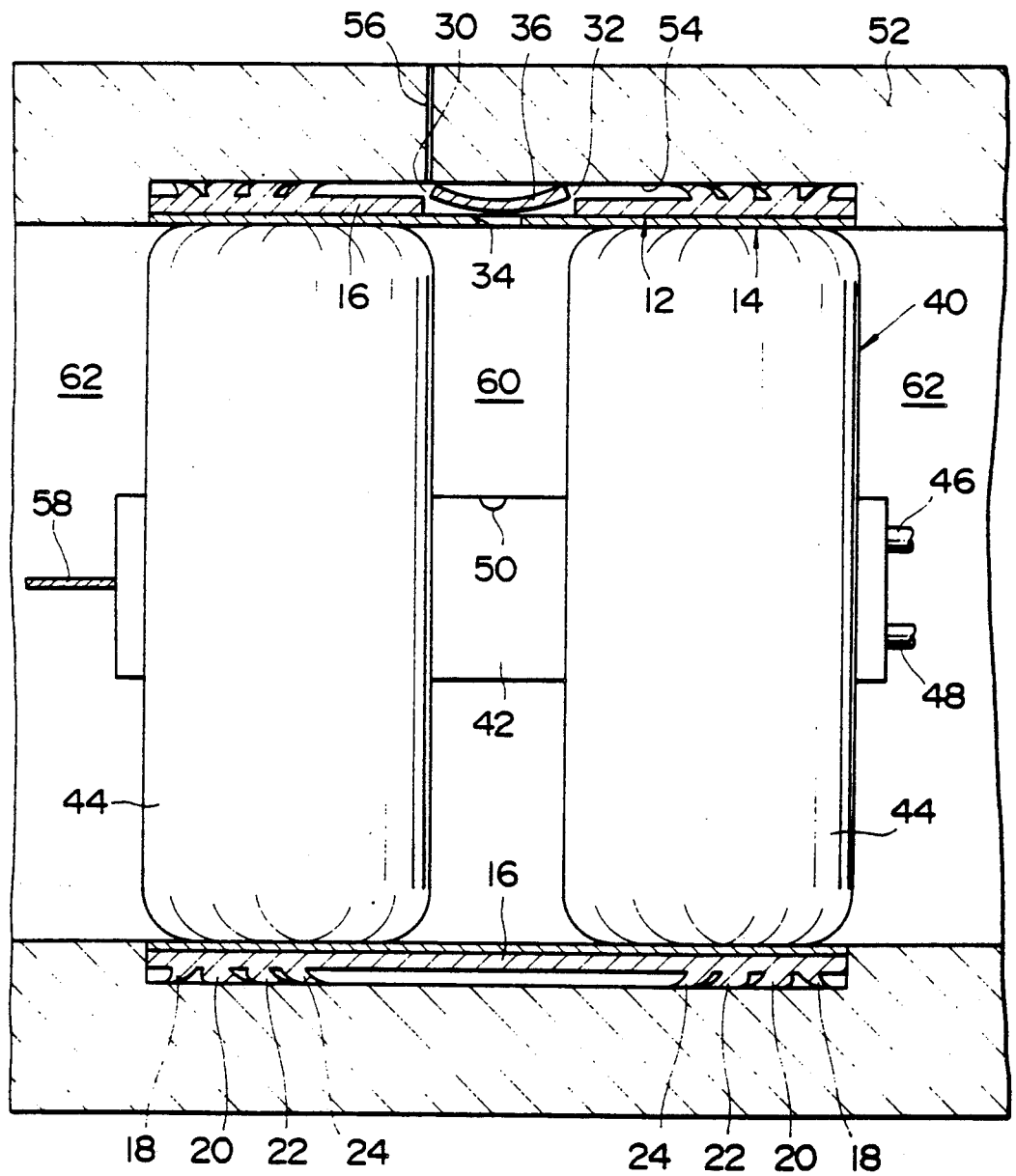
FIG. 4 is an enlarged cross-sectional view of a liner of a preferred embodiment of the present invention in a radially expanded condition and an expanding machine.

As shown in FIG. 4, liner 10 is placed in an expanding machine 40 for expanding liner 10.

Expanding machine 40 comprises a shaft portion 42; a pair of expansion portions 44 fixed on the shaft portion 42 at intervals in the axial direction thereof and expanded by compressed fluid like a floating ring; a nipple 46 for receiving the compressed fluid such as injection material exhibiting fluidity and hardenability. Nipple 46 and both expansion portions 44 communicate through a hole (not shown) formed in shaft portion 42. Shaft portion 42 has a spout 50 for the injection material opening to the circumferential surface of the position between both expansion portions 44. Spout 50 communicates with nipple 48 through another hole (not shown) formed in shaft portion 42.

As expanding machine 40, for instance, a known water-sealing injector is commercially available and has been manufactured by Toa Grout Kogyo Kabushiki Kaisha. Expanding machine 40 is received into the inside of liner 10, namely, the inside of base 14 with expansion portions 44 in a contracted condition.

Liner 10 is located in expanding machine 40, such that hole 34 of base 14 is positioned between both expansion portions 44.

Subsequently, each expansion portion 44 is expanded by the compressed fluid supplied to expansion portion 44 through nipple 46 and shaft portion 42 to the extent that liner 10 does not displace relative to expanding machine 40 and is maintained as it is. The compressed fluid is supplied to nipple 46 through a hose from a fluid source placed on the ground.

As shown in FIG. 4, a recess 54 is preformed in order to place liner 10 in the portion within a pipe 52 to be processed for leakage prevention. Recess 54 extends successively and circumferentially on the inner surface of pipe 52. The axial length of recess 54 is substantially equal to that of liner 10, but the depth of recess 54 is slightly smaller than the thickness of liner 10 including the height of projection portions 20. The portion to be processed is the portion having a crack 56 of pipe 52 in FIG. 4, but may be a communication portion between mutually adjacent pipes 52.

The, liner 10 and expanding machine 40 are moved from one end of pipe 52 to the position of recess 54 within pipe 52. This may be accomplished by pulling a rope 58 connected to expanding machine 40 toward the side of the other end of pipe 52. Liner 10 and expanding machine 40 are moved together to a predetermined position by monitoring a picture image through a TV camera.

When liner 10 and expanding machine 40 are moved to the predetermined position within pipe 52, expansion portion 44 is further expanded by the compressed fluid supplied to nipple 46. In this manner, liner 10 is disposed at recess 54, such that both ends of base 14 are the extent that both engaging portions 26 and 28 are engaged with each other.

When base 14 is radially expanded, liner 10 is pressed against the inner surface of pipe 52, and as a result, sleeve 12 is compressed. However, since the cross-sectional form of each projection portion 18, 20, 22 and 24 is a triangle, projection portions 18, 20, 22 and 24 are elastically deformed when liner 10 is pressed against the inner surface of pipe 52. Namely, in the illustrated embodiment of FIG. 5, projection portions 18, 20, 22 and 24 are bent toward the opposite side of projection portion 20, toward the side of projection portion 22, toward the side of projection portion 24 and toward the opposite side of projection portion 22, respectively, and then further compressed. As a result, each projection portion 18, 20, 22 and 24 is pressed by the restoring force thereof against the inner surface of pipe 52.

Each projection portion 18, 20, 22 and 24 is integral with sleeve 12, and the portion at the side of cylindrical portion 16 of projection portions 18, 20, 22 and 24 does not expand in the axial direction of sleeve 12 even though projection portions 18, 20, 22 and 24 are compressed. As a result, projection portions 18, 20, 22 and 24 are surely pressed against the inner surface of pipe 52.

When base 14 is radially expanded to the predetermined dimension, each hole 34 aligns opposite to portion 36 between cuts 30 and 32 of sleeve 12 and is blocked by opposite portion 36. As each expansion portion 44 of expanding machine 40 is abutted against the inner surface of base 14 so that expansion portions 44 may press sleeve 12 against the inner surface of pipe 52, a space 60 of the internal space of pipe 52 located between expansion portions 44 is partitioned by expansion portions 44 from another space 62.

Then the injection material exhibiting fluidity and hardenability, like a slurry type cement, is supplied to nipple 48 of expanding machine 40 from an injection material source installed on the ground at a higher pressure than the earth pressure around pipe 52. Powder, liquid or slurry material can be used as an injection material. Also, a material exhibiting a coagulating property and hardenability is desirable.

The injection material provided to nipple 48 enters space 60 from a spout 50 of expanding machine 40. The injection material that has entered space 60 pushes each portion 36 of sleeve 12 from hole 34 of base 14 to force cuts 30 and 32 of sleeve 12 open. This injection material then flows out of and around pipe 52 by way of crack 56 or the joint portion of adjacent pipes 52 through the space between liner 10 and pipe 52 from cuts 30 and 32.

When a predetermined amount of the injection material is injected around pipe 52, the supply of the injection material to nipple 48 is stopped. As the pressure within space 60 is lowered by this action and the earth pressure around pipe 52 acts against the circumferential surface of sleeve 12, each hole 34 of ; base 14 is blocked by portion 36 of sleeve 12. The to space 60 from each hole 34 of base 14 even though the pressure of space 60 becomes lower than that around liner 10.

Figure 6:
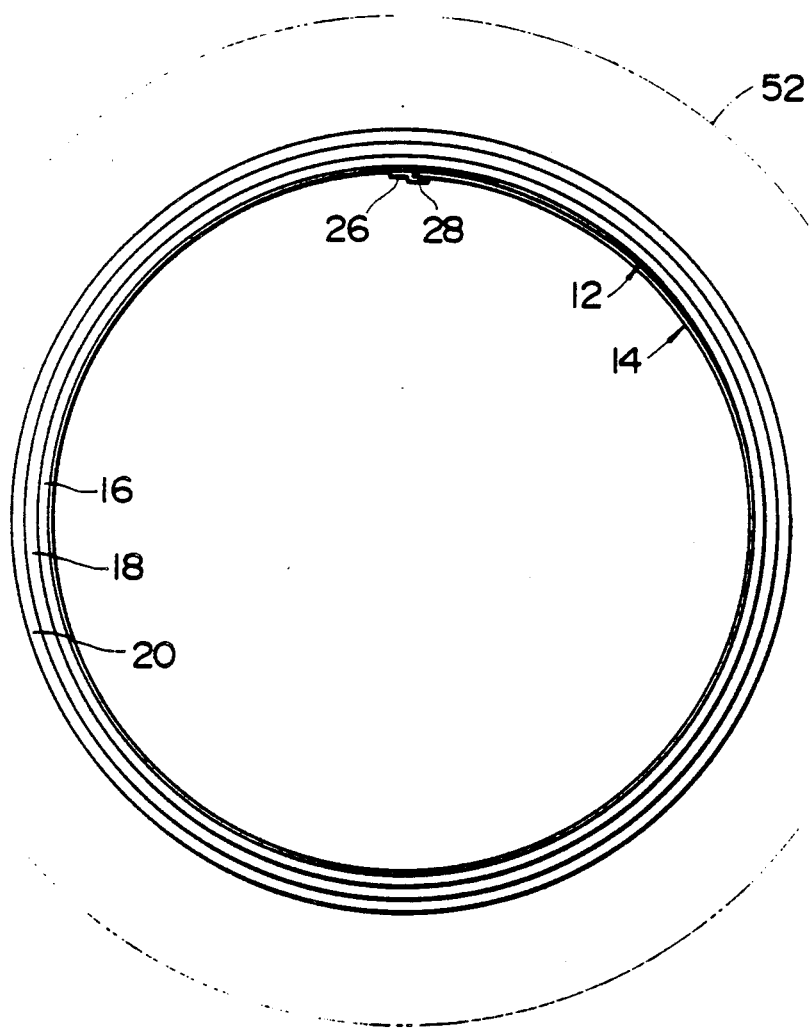
FIG. 6 is a side view of engaged female and male engaging portions of a preferred embodiment of the present invention.

After the compressed fluid in expansion portions 44 is removed, expanding machine 40 is removed from pipe 52 together with the TV camera. When the compressed fluid is removed from expansion portions 44, sleeve 12 applies a contracting force to base 14, and male engaging portion 28 in base 14 is inserted into female engaging portion 26 as shown in FIG. 6. In this manner, sleeve 12 is maintained in an expanded condition.

Figure 5:
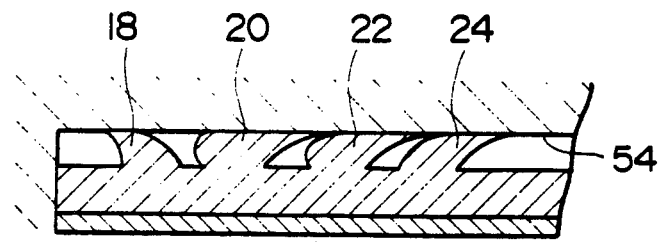
FIG. 5 is an enlarged cross-sectional view of an elastically deformed projection portion of a preferred embodiment of the present invention.

When female and male engaging portions 26 and 28 of base 14 are engaged with each other, base 14 is slightly radially contracted. However, the contraction of base 14 is absorbed as a result of a slight recovery of projection portions 18, 20, 22 and 24. In this manner, projection portions 18, 20, 22, and 24 of sleeve 12 remain pressed against inner surface of pipe 52 as shown in FIGS. 4 and 5. Thus, each hole 34 of base 14 is maintained in a blocked condition by portion 36 of sleeve 12.

FIGS. 4 and 5 show that a void may be formed between adjacent projection portions depending on the deformation amounts of projection portions 18, 20, 22, and 24. FIG. 6 appears to indicate that each projection portion 18, 20, 22 and 24 would not be deformed, but as a matter of fact, each is deformed as described above.

When expanding machine 40 is removed, a large part of the injection material remaining in space 60 is also removed together therewith. The inside of pipe 52 is then washed with water or the like, whereby the remaining injection material in pipe 52 is removed with the cleaning water, which does not flow out around liner 10 so long as the pressure thereof is held below the earth pressure around pipe 52.

The injection material around liner 10, within crack 56, and within the joint and/or around pipe 52 coagulates with the lapse of time and hardens. In this manner, leakage into and out from pipe 52 is prevented.

According to the above-mentioned embodiment, there is little risk that foreign matter in the fluid flowing inside pipe 52 will become trapped in liner 10. However, it is not necessary to form recess 54.

It is desirable to clean the inside of pipe 52 prior to the disposition of liner 10 therein and also to close the inlet of pipe 52 so that other fluid such as sewage may not flow therein during repairs.

Figure 7A:
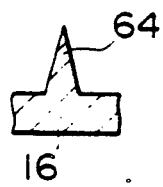
FIG. 7(A), (B), (C), (D) and (E) are cross-sectional views of a projection portion of other preferred embodiments of the present invention.
Figure 7C:
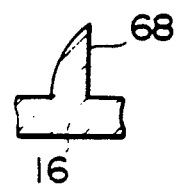
Figure 7B:
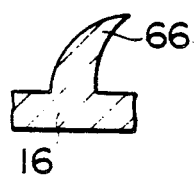
Figure 7D:
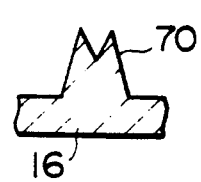
Figure 7E:
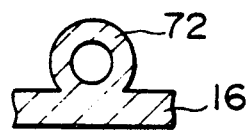

The cross-sectional shapes of projection portions 18, 20, 22 and 24 may differ from the above-mentioned shapes. A projection portion 64 shown in FIG. 7(A) has the cross-sectional shape of an isosceles triangle. Projection portions 66 and 68 shown in FIGS. 7(B) and 7(C) have cross-sectional shapes like a brush-tip. A projection portion 70 shown in FIG. 7(D) has an inverted W-like cross-sectional shape. According to these embodiments, water-tightness between liner 10 and pipe 52 can be maintained by pressing projection portions 64, 66, 68 and 70 against the inner surface of pipe 52, even though there is irregularity on the inner surface of pipe 52. However, the cross-sectional shape of the projection portions may be trapezoidal or the like. A projection portion 72 shown in FIG. 7(E) has a tubular cross-sectional shape and is elastically deformed when liner 10 is pressed against the inner surface of pipe 52 even in case where liner 10 has such projection portion 72.

It is not always necessary that engaging portions 26 and 28, used as fixing means to maintain expansion of base 14, successively extend in the cross direction of base 14, and engaging portions of different shapes and kinds may be utilized.

Figure 8:
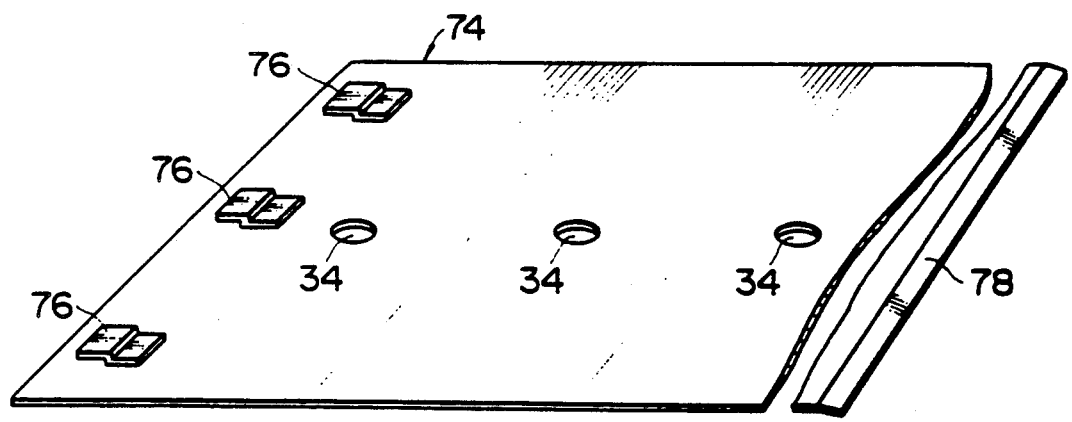
FIG. 8 is a perspective view of a base of another embodiment of the present invention.

A base 74 shown in FIG. 8 has female engaging portions 76 at a plurality of positions at intervals in the cross direction thereof and at the one end of the longitudinal direction thereof. Each female engaging portion 76 consists of metal fitting having a Z-like cross-sectional shape, and the metal fittings are fixed at base 74 at intervals in the cross direction of base 74. A male engaging portion 78 receivable within female engaging portions 76 to be engaged therewith is the other end of base 74 in the illustrated embodiment, but a male engaging portion of another shape may be utilized.

Figure 9A:
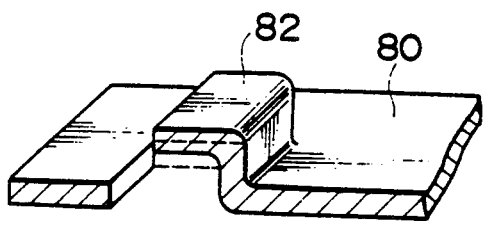
FIGS. 9(A), (B) and (C) are perspective views of male and female engaging portions of other preferred embodiments of the present invention.
Figure 9B:
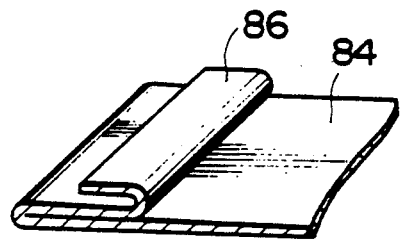
Figure 9C:
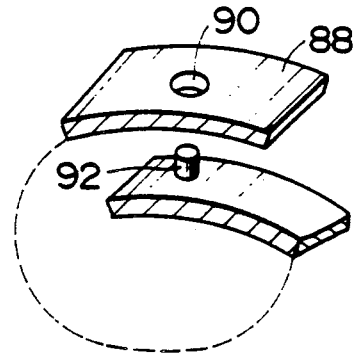

A female engaging portion 82 consists of a tongue embossed by pressing part of base 80 from one side of base 80 to the other side as shown in FIG. 9(A). A female engaging portion 86 is formed by folding one end of base 84 into a Y-like shape as shown in FIG. 9(B). Further, a female engaging portion 90 consists of a plurality of holes formed at one end of a base 88 as shown in FIG. 9(C). In the latter embodiment, a projection formed at the other end portion of base 88 capable of insertion into female engaging portion 90 may be utilized as a male engaging portion 92.

As fixing means for maintaining the base in an expanded condition, a plurality of male or female engaging portions may be formed at intervals in the longitudinal direction of the base. One engaging portion can be engaged with a corresponding engaging portion, thereby permitting selection of engaging portions to be engaged with each other on the basis of the pressure of the liner.

Figure 10:
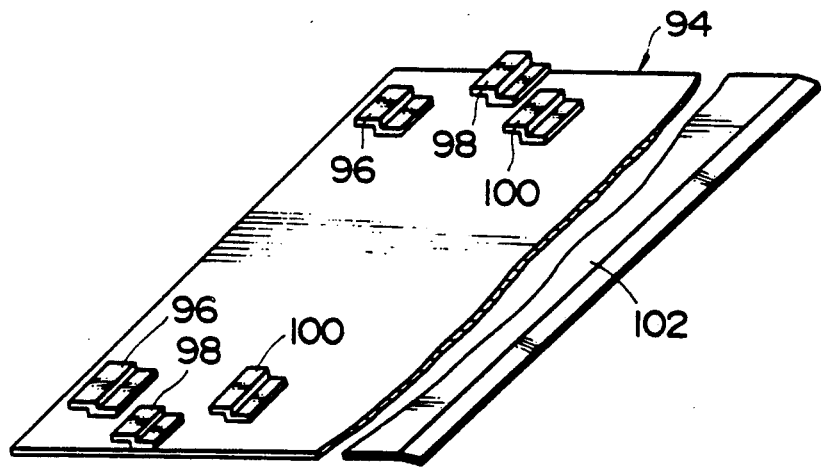
FIG. 10 is a perspective view of engaging portions of a further preferred embodiment of the present invention.

The fixing means of a base 94 shown in FIG. 10 has a plurality of female engaging portions 96, 98 and 100 along a plurality of respective virtual lines at intervals in the longitudinal direction of base 94 and a male engaging portion 102 selectively engagable with female engaging portions 96, 98 and 100. Female engaging portions 96, 98 and 100 consist of Z-like metal fittings fixed at a predetermined position with respect to one end portion of base 94. Male engaging portion 102 is the other end portion of base 94 and is slightly bent. Since male engaging portion 102 can be engaged with one of female engaging portions 96, 98 or 100, the female engaging portion that engages male engaging portion 102 can be selected depending on the pressure of the liner applied to the pipe.

Figure 11:
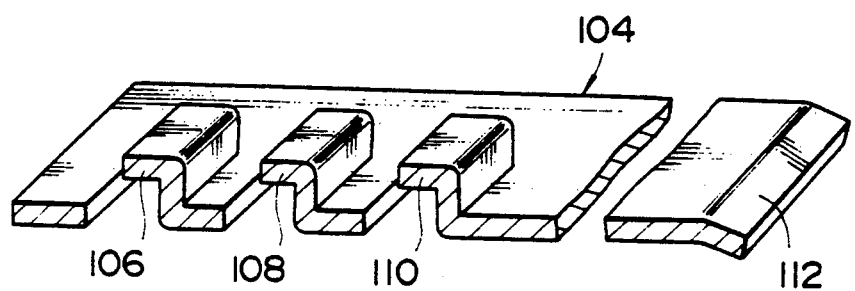
FIG. 11 is a partial perspective view of a base of a further preferred embodiment of the present invention.

The fixing means for a base 104 shown in FIG. 11 has a plurality of female engaging portions 106, 108 and 110 formed at one end portion of base 104 in a matrix-like form, and a male engaging portion 112 of the other end portion of base 104. Female engaging portions 106, 108 and 110 consist of a tongue embossed from one side of base 104 to the other side by pressing part of base 104. Male engaging portion 112 is slightly bent.

Figure 12:
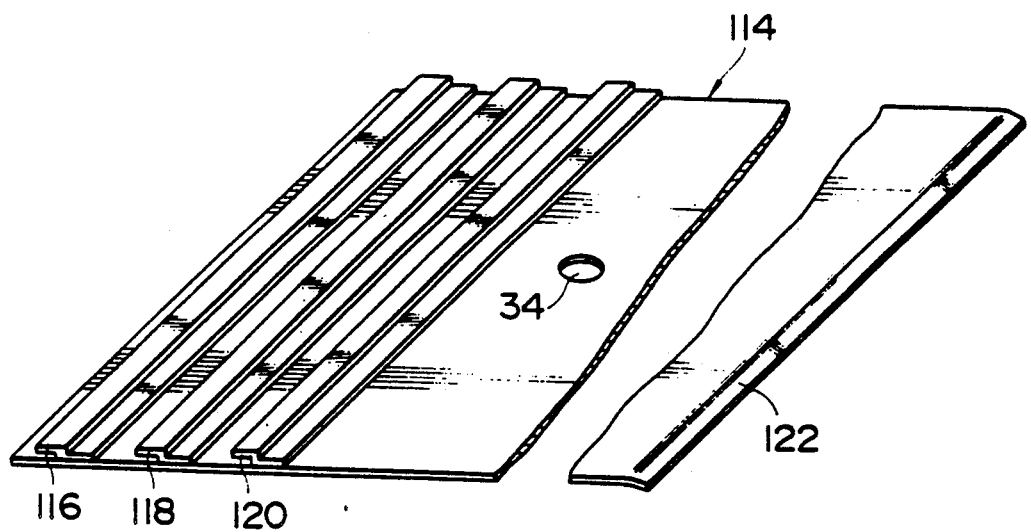
FIGS. 12 and 13 and 14 are perspective views of a base of further embodiments of the present invention.

The fixing means for a base 114 shown in FIG. 12 has a plurality of female engaging portions 116, 118 and 120 extending in parallel to the cross direction of base 114 and at intervals in the longitudinal direction of base 114, and a male engaging portion 122 selectively engagable with female engaging portions 116, 118 and 120. Female engaging portions 116, 118 and 120 consist of Z-like metal fittings fixed at predetermined positions of one end of base 114 and extend successively in the cross direction of base 114. Male engaging portion 122 is the other end portion of base 114 and is slightly bent.

Figure 13:
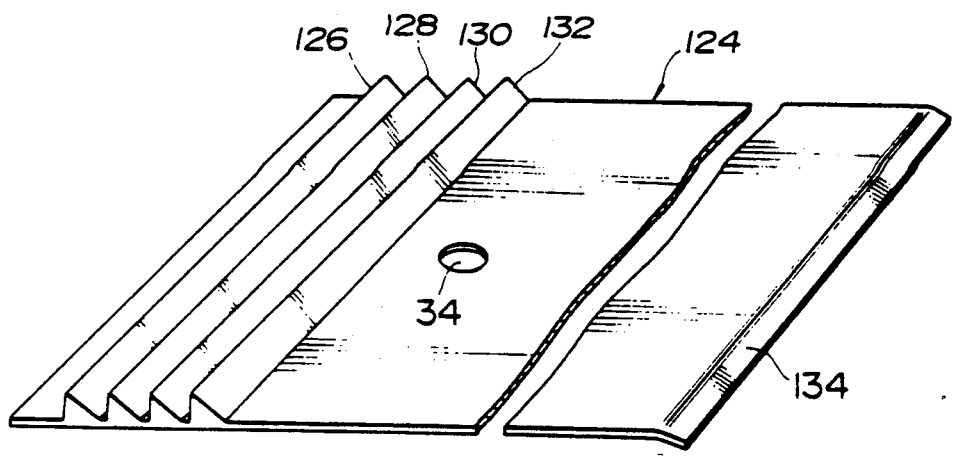

The fixing means for a base 124 shown in FIG. 13 at one end portion of base 124 at intervals in the longitudinal direction thereof and an engaging portion 134 engagable with one of engaging portions 126, 128, 130 and 132. Engaging portions 126, 128, 130 and 132 consist of a member having a triangle cross-sectional form that is fixed on base 124. Engaging portion 134 is the other end portion of base 124 and is bent to be easily engaged with engaging portions 126, 128, 130 and 132. Each engaging portion 126, 128, 130 and 132 may be divided into parts in the cross direction of base 124.

Figure 14:
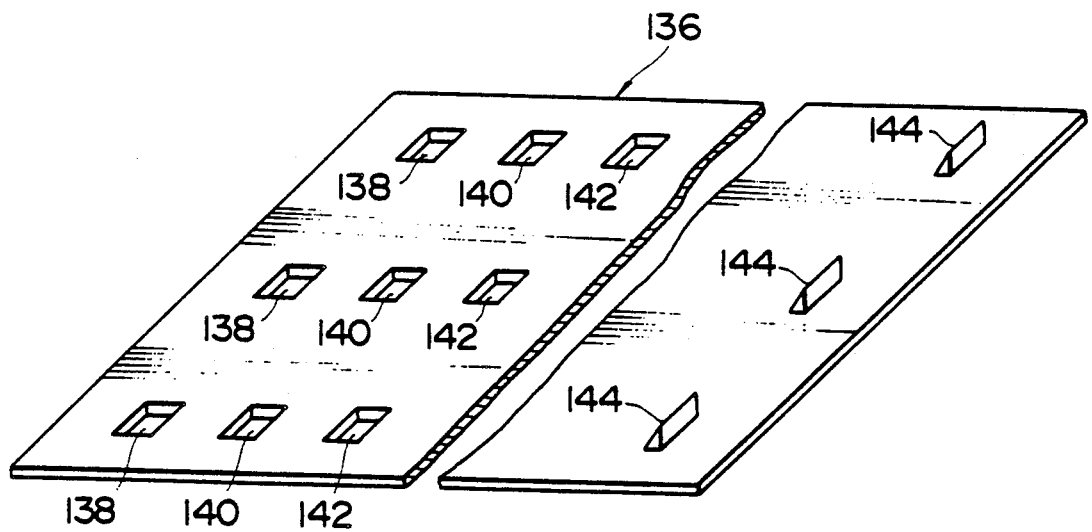
Figure 15:
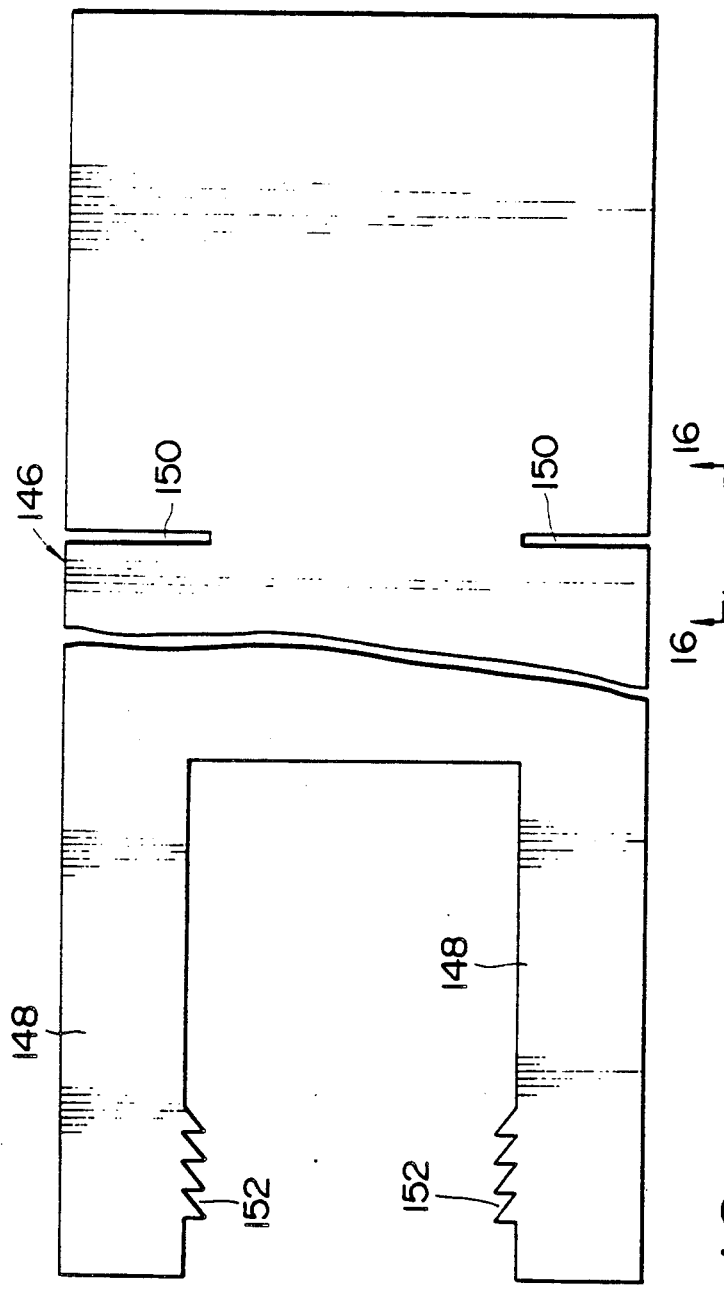
FIG. 15 is a development view of the base of another preferred embodiment of the present invention.
Figure 16:
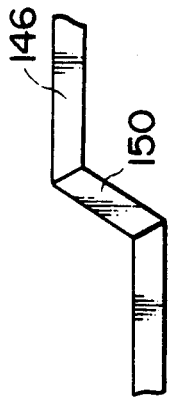
FIG. 16 is an enlarged side view taken along the line 16—16 in FIG. 15.

The fixing means for a base 136 shown in FIG. 14 has a plurality of engaging portions 138, 140 and 142, including a plurality of rectangular holes formed at one end portion of base 136 in a matrix-like form, and engaging portions 144, including a plurality of projection portions formed at the other end portion of base 136. Each projection portion 144 corresponds to holes 138, 140 and 142 that, in turn, correspond to a matrix row. Holes 138, 140 and 142 extend through base 136 in the thickness direction thereof, and a pair of opposed sides of the rectangular hole 138, 140 and 142 is positioned in the cross direction of base 136. Each engaging portion 144 has a right-angled triangular cross-sectional form and is fixed to base 136, such that one of the two faces corresponding to the two sides intersecting at right angles in the right-angled triangle is at the other end of base 136 and the other of the two faces is at the side of base 136.

The fixing means for a base 146 shown in FIGS. 15, 16, 17 and 18 has a pair of belt-shaped extending portions 148 extending in parallel at an interval in the cross direction of base 146 from the end edge of base 146. The end portion of base 146 on the side opposite extending portion 148 is deformed to be slightly larger in the thickness direction thereof from the other portion.

In the deformed portion of base 146, a pair of long and narrow notch portions 150 are formed at an interval in the cross direction of base 146. Notch portions 150 correspond to extending portions 148. Also, each notch portion 150 extends toward the center from the end edge of base 146 in the cross direction thereof. The length of notch portion 150 is approximately equal to the width of corresponding extending portion 148. In the inside of the tip portion of each extending portion 148, a sawtooth-like portion 152 is formed. Each tooth of sawtooth-like portion 152 is engagable with notch portion 150 of base 146.

Figure 17:
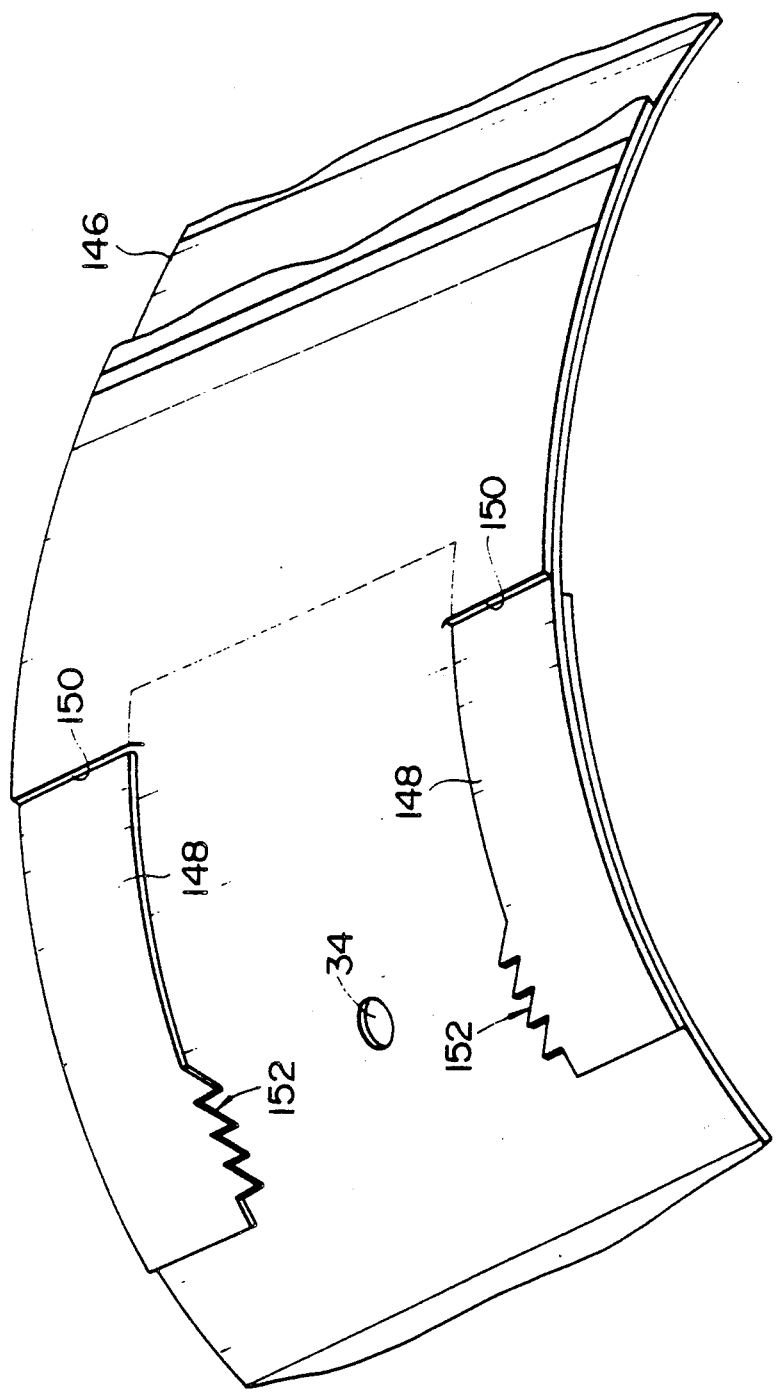
FIG. 17 is an enlarged perspective view of the condition prior to the engagement of the engaging portions of the base of the present invention shown in FIG. 15.
Figure 18:
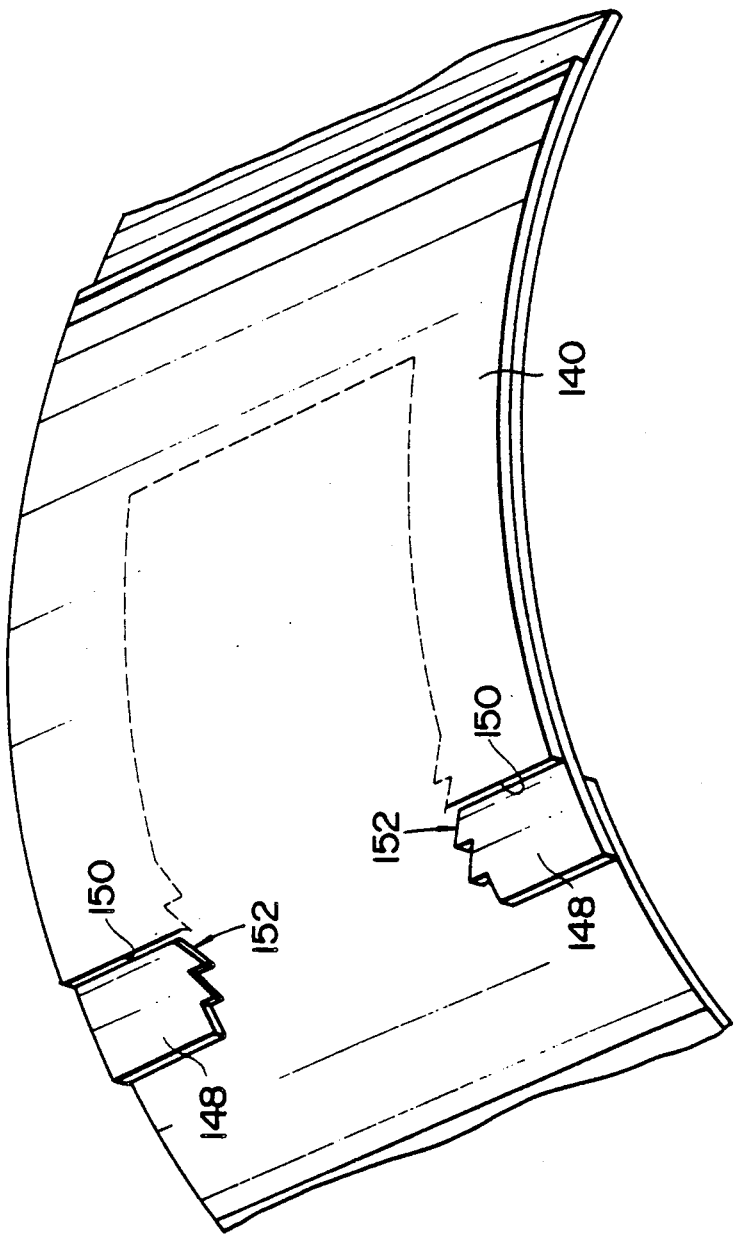
FIG. 18 is a perspective view of the engaged condition of the engaging portions of the base of the present invention shown in FIG. 15.

As shown in FIG. 17, base 146 is disposed inside the sleeve in a wound-up condition, such that extending portion 148 passes through notch portion 150 from the inside of base 146 to the outside thereof and a large part of extending portion 148 is located outside of base 146. Also as shown in FIG. 18, base 146 is maintained in a cylindrically expanded condition by engaging any of the teeth in the sawtooth-like portion 152 with notch portion 150 of base 146. Therefore, in base 146, the teeth in sawtooth-like portion 152 and notch portion 150 in base 146 act as fixing means to maintain base 146 in an expanded condition.

The present invention is applicable to treatment for leakage prevention in actually leaking pipeline portions and for pipeline portions likely to leak where cracks and the like are formed.

What is claimed is:

1. A method for water leakage prevention utilizing an injection material exhibiting fluidity and hardenability to prevent water leakage into and out from a pipeline, comprising:

disposing inside a pipe defining said pipeline a liner provided with an elastically deformable sleeve having an outer diameter smaller than an inner diameter of said pipe and having a plurality of elastically deformable and successively circumferentially extending projection portions formed at intervals on a circumferential surface of the sleeve in an axial direction thereof; a sheet-like base placed inside said sleeve in a radially expandable, wound cylindrical form; fixing means for maintaining said base in a substantially cylindrical shape when said base is radially expanded in said sleeve; and check valve means defined by said sleeve and said base when said base is radially expanded, said check valve means permitting said injection material to flow from a position inside of said base into a space between said projection portions in the axial direction;

radially expanding said base to elastically deform said sleeve until said projection portions are pressed against an inner surface of said pipe and are elastically deformed;

supplying said injection material into a space between said sleeve and said pipe through said check valve means while maintaining said projection portions in an elastically deformed condition; and keeping said base in an expanded condition through said fixing means to maintain said projection portions in said elastically deformed condition.

2. A method for water leakage prevention according to claim 1 wherein said check valve means includes a pair of cut portions formed on said sleeve and spaced apart from each other, said cut portions extending through said sleeve in a thickness direction thereof, and a hole extending through said base in a thickness direction thereof located at a position corresponding to a portion between the cut portions on the sleeve.

3. A method for water leakage prevention according to claim 2 wherein said injection material is supplied into a space defined inside said liner and communicated with said check valve means, while said space is partitioned by an expanding means for said base from another space.

4. A method for water leakage prevention according to claim 3, further comprising removing said expanding means after keeping said base in an expanded condition through said fixing means.

5. A method for water leakage prevention utilizing an injection material exhibiting fluidity and hardenability to prevent water leakage into and out from a pipeline, comprising:

cutting a pipe defining said pipeline in order to form an annular recess along an inner surface of said pipe at a predetermined position in said pipe;

disposing in said recess a liner provided with an elastically deformable sleeve having an outer diameter smaller than an inner diameter of said pipe and having a plurality of elastically deformable and successively circumferentially extending projection portions formed at intervals on a circumferential surface of the sleeve in an axial direction thereof; a sheet-like base placed inside said sleeve in a radially expandable, wound cylindrical form; fixing means for maintaining said base in a substantially cylindrical form when said base is radially expanded in said sleeve; and check valve means defined by said sleeve and said base when said base is radially expanded, said check valve means permitting said injection material to flow from a position inside of said base into a space between said projection portions in the axial direction;

radially expanding said base to elastically deform said sleeve until said projection portions are pressed against an inner surface of said pipe and are elastically deformed;

supplying said injection material into a space between said sleeve and said pipe through said check valve means while maintaining said projection portions in an elastically deformed condition; and keeping said base in an expanded condition through the fixing means to maintain said projection portions in said elastically deformed condition.

6. A liner for water leakage prevention into and out from a pipeline, comprising:

an elastically deformable sleeve having a plurality of elastically deformable and successively circumferentially extending projection portions formed at intervals on a circumferential surface of the sleeve in an axial direction thereof;

a sheet-like base placed inside said sleeve in a radially expandable, wound cylindrical form;

fixing means for maintaining said base in a substantially cylindrical form when said base is radially expanded in said sleeve; and check valve means defined by said sleeve and said base when said base is radially expanded, said check valve means permitting an injection material exhibiting fluidity to flow from a position inside of said base into a space between said projection portions in the axial direction.

7. A liner for water leakage prevention according to claim 6 wherein said check valve means includes a pair of cut portions formed on said sleeve and spaced apart from each other, said cut portions extending through said sleeve in a thickness direction thereof, and a hole extending through said base in a thickness direction thereof located at a position corresponding to a portion between said cut portions on the sleeve.

* * * * *

UNITED STATES PATENT AND TRADEMARK OFFICE
CERTIFICATE OF CORRECTION

PATENT NO. : 5,096,332  Page 1 of 2
DATED : March 17, 1992
INVENTOR(S) : Takayuki Kawafuji It is certified that error appears in the above-identified patent and that said Letters Patent is hereby corrected as shown below:

Column 1, line 10, after "relates" insert --to a method for water leakage prevention utilizing an--.

Column 2, line 8, after "the", third occurance, insert --pipeline. As the liner is attached on the inner surface--.

Column 4, line 1, change "FIG" to --FIGS--.

Column 5, line 65, after "as" insert --compressed air; and another nipple 48 for receiving an--.

Column 6, line 33, change "The" to --Then--.

Column 6, line 45, after "are" insert --radially expanded to slightly overlap or, in other words, to--.

Column 7, line 34, after "of" delete ";".

Column 7, line 35, after "The" insert --injection material around liner 10 does not flow backward--.

UNITED STATES PATENT AND TRADEMARK OFFICE
CERTIFICATE OF CORRECTION

PATENT NO. : 5,096,332
DATED : March 17, 1992
INVENTOR(S) : Takayuki Kawafuji

It is certified that error appears in the above-indentified patent and that said Letters Patent is hereby corrected as shown below:

Column 9, line 33, after "13" insert --has a plurality of engaging portions 126, 128, 130, and 132--.

Signed and Sealed this

First Day of March, 1994

*Attest:*

BRUCE LEHMAN

*Attesting Officer*     *Commissioner of Patents and Trademarks*